United States Patent [19]

Buslepp et al.

[11] Patent Number: 4,719,893
[45] Date of Patent: Jan. 19, 1988

[54] INTERNAL COMBUSTION ENGINE WITH THROTTLE TIPOUT DILUTION REDUCTION

[75] Inventors: Kenneth J. Buslepp, Utica; Kenneth J. Cinpinski, Sterling Heights; James H. Currie, Rochester, all of Mich.

[73] Assignee: General Motors Corporation, Detroit, Mich.

[21] Appl. No.: 24,289

[22] Filed: Mar. 10, 1987

[51] Int. Cl.⁴ ............................................. F02M 25/06
[52] U.S. Cl. ..................................................... 123/571
[58] Field of Search ......................... 123/568, 569, 571

[56] References Cited

U.S. PATENT DOCUMENTS

| | | | |
|---|---|---|---|
| 4,280,471 | 7/1981 | Masaki | 123/571 |
| 4,289,108 | 9/1981 | Shioyama | 123/571 |
| 4,378,777 | 4/1983 | Iida et al. | 123/571 |
| 4,548,185 | 10/1985 | Pozniak | 123/571 |
| 4,630,589 | 12/1986 | Hashiguchi et al. | 123/571 |

Primary Examiner—Willis R. Wolfe
Attorney, Agent, or Firm—Robert M. Sigler

[57] ABSTRACT

An internal combustion engine with a throttle valve, fuel supply and dilution (EGR) control includes apparatus effective to detect a throttle tipout condition comprising a rate of throttle closing exceeding a predetermined reference rate and decrease the dilution from the scheduled value to its minimum value during the existence of the throttle tipout condition and further apparatus effective to detect the end of the throttle tipout condition and return the dilution to its scheduled value at a controlled rate. Thus, a sudden unscheduled increase in dilution caused by a throttle tipout associated increase in intake manifold vacuum is reduced and driveability improved.

3 Claims, 5 Drawing Figures

INTERNAL COMBUSTION ENGINE WITH THROTTLE TIPOUT DILUTION REDUCTION

BACKGROUND OF THE INVENTION

This invention relates to internal combustion engines of the type having a throttle controlling airflow to a combustion chamber, fuel supply apparatus for forming a combustible charge in the combustion chamber and EGR apparatus for introducing recirculated exhaust gasses to the fuel charge to control the dilution thereof. In particular, it relates to such engines in which the rapid closing of the throttle, in a throttle tipout condition, produces increasing intake manifold vacuum and thus causes an unscheduled temporary increase in dilution. This may occur with a separately controlled EGR valve or with internal EGR control using a variable valve lift apparatus for combustion chamber exhaust valve control.

SUMMERY OF THE INVENTION

The invention is an internal combustion engine of the type described above which comprises apparatus effective to detect a throttle tipout condition comprising a rate of throttle closing exceeding a predetermined reference rate and decrease the dilution from the scheduled value to its minimum value during the existence of the throttle tipout condition and further apparatus effective to detect the end of the throttle tipout condition and return the dilution to its scheduled value at a controlled rate. In the case of an external EGR valve, the minimum EGR value generally corresponds to a complete closure of the valve. In the case of a variable valve lift apparatus, the minimum value will reduce valve lift to produce minimum EGR consistent with other engine operating considerations. The reduction in the sudden unscheduled increase in dilution results in improved driveability. Further details and advantages will be apparent from the accompanying drawings and following description of a preferred embodiment.

DESCRIPTION OF A PREFERRED EMBODIMENT

Figure 1:
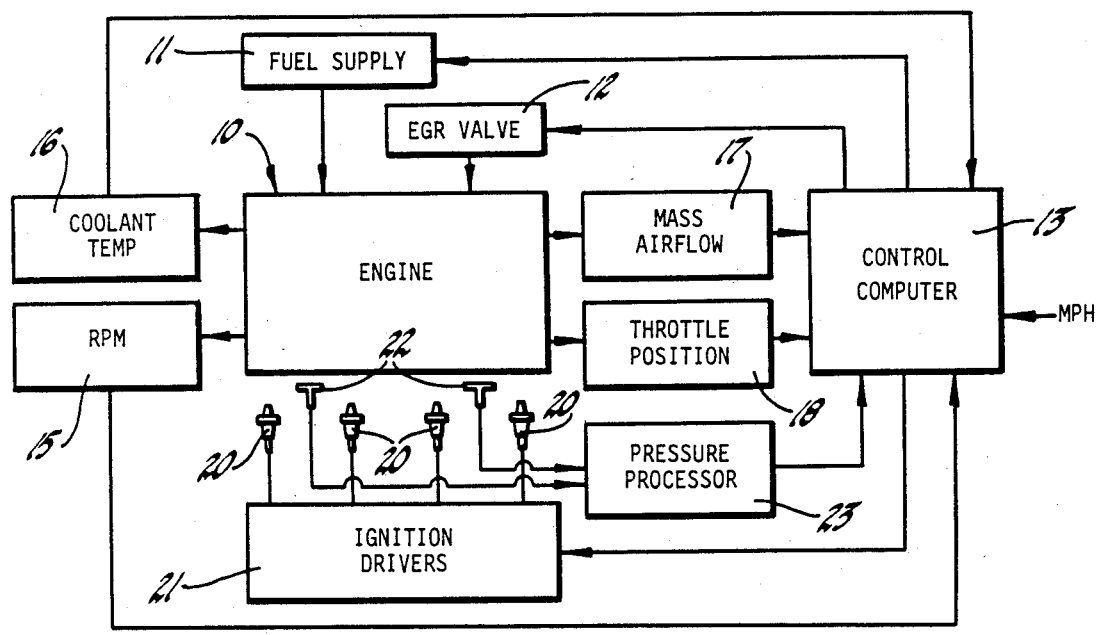
FIG. 1 shows a block diagram of an engine with a control according to this invention.

Referring to FIG. 1, an internal combustion engine 10 is of the standard type having a plurality of cylinders or combustion chambers. In this embodiment, there are four such cylinders, each provided with air and fuel through standard fuel supply apparatus 11. Fuel supply apparatus 11 comprises normal air intake apparatus including air cleaner, intake manifold, throttle valve and intake valves, and normal fuel injection apparatus including fuel injectors and injector drivers which are activated in response to timed, sequential signals from a control computer 13. The air and fuel forms a combustible fuel charge within the combustion chamber which has a composition controlled in the normal manner through the duration of the injector pulses relative to the mass of air in the cylinder and by dilution control apparatus. The air/fuel ratio control may be stoichiometric in response to a standard oxygen sensor in the exhaust system of engine 10.

The dilution control apparatus may include an exhaust gas recirculation (EGR) valve 12 to control the rate of inert exhaust gases fed back to the air supply apparatus. The degree of opening of EGR valve 12 is controlled through a range from closed to maximum open by a stepper motor or equivalent means for accurate control of EGR flow, the stepper motor receiving positioning signals from computer 13. Other forms of dilution control apparatus may be used, either alternatively or in addition. For example, a variable lift adjusting device for the exhaust valves of engine 10 is described in U.S. Ser. No. 834,791, Variable Valve Lift/Timing Mechanism, filed Feb. 28, 1986 by Duane J. Bonvallet and issued on Jan. 27, 1987 as U.S. Pat. No. 4,638,773. This device, actuated by a stepper motor or other actuator means, will also be effective to control the dilution of the fuel charge within the associated combustion chamber.

Control computer 13 may be a standard digital microcomputer having a microprocessor, RAM, ROM, input/output apparatus and a clock and typified by a microcomputer of the Motorola (R) 6800 series. It includes, in ROM, a stored program for controlling fuel supply system 11, EGR valve 12 and an ignition system, to be described below, in response to values of engine operating parameters from a plurality of sensors. An engine speed (RPM) sensor 15 may be based on a 180 tooth wheel turning with the engine harmonic balancer and a magnetic or other pickup to generate electrical pulses as it is passed by teeth of the rotating wheel. Control computer 13 or other dedicated apparatus may measure the time between consecutive RPM pulses and generate an engine speed signal therefrom. In addition, the counting of the RPM pulses can be used along with absolute crankshaft reference pulses from the standard distributor, not shown, of engine 10 to indicate absolute crankshaft rotational position at any time. If the arcs of the teeth and the spaces between the teeth are equal, a pulse can be generated every degree of crankshaft rotation. A coolant temperature sensor 16 of the normal type supplies a coolant temperature signal to computer 13. A mass airflow sensor 17 generates a signal of the mass air flow rate to the cylinders; and throttle position sensor 18 generates a throttle position signal, both said signals being provided to computer 13. Throttle position sensor 18 and coolant temperture sensor 16 are useful for controlling entry of the system into power enrichment and start/warmup operating modes, respectively.

Each cylinder of engine 10 is provided with a spark plug 20 effective, when fired, to initiate combustion of the combustible charge within the combustion chamber. Spark plugs 20 are fired by ignition drivers 21 in response to signals from computer 13. Spark plugs 20 and ignition drivers 21 may be of any standard type, with ignition drivers 21 responsive to firing pulses to fire spark plugs 20 and further effective to control the ignition dwell time.

Computer 13 includes means, such as stores tables, for storing or determining predetermined schedules for fuel injection pulse width (combustion mixture air/fuel ratio), ignition timing and dilution (EGR). Such tables may use input lookup parameters based on engine speed and load and may be subject to modification or trim by other sensed engine operating parameters. For example, combustion pressure sensors 22 may be provided to sense the pressure within the cylinders of engine 10 and generate a signal thereof. A pressure signal processor 23 may be provided to detect timing and/or amplitude of peak combustion pressure for use by computer 13 in determining any or all of the predetermined fuel, ignition or EGR schedules.

Figure 2:
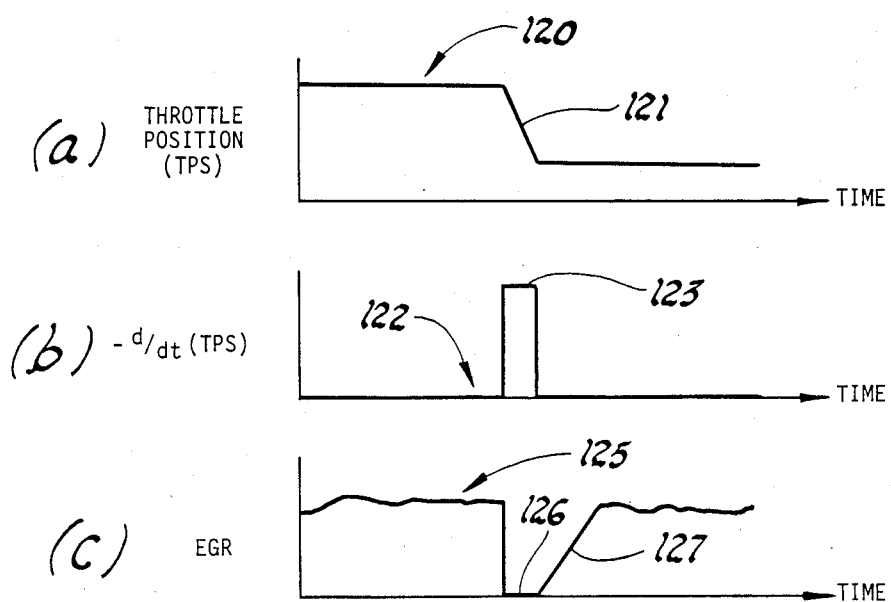
FIGS. 2(a)-2(c) show plots of throttle position, the negative derivative of throttle position and the EGR output signal, respectively, vs. time during a throttle tipout and recovery for the engine and control of FIG. 1.
Figure 3:
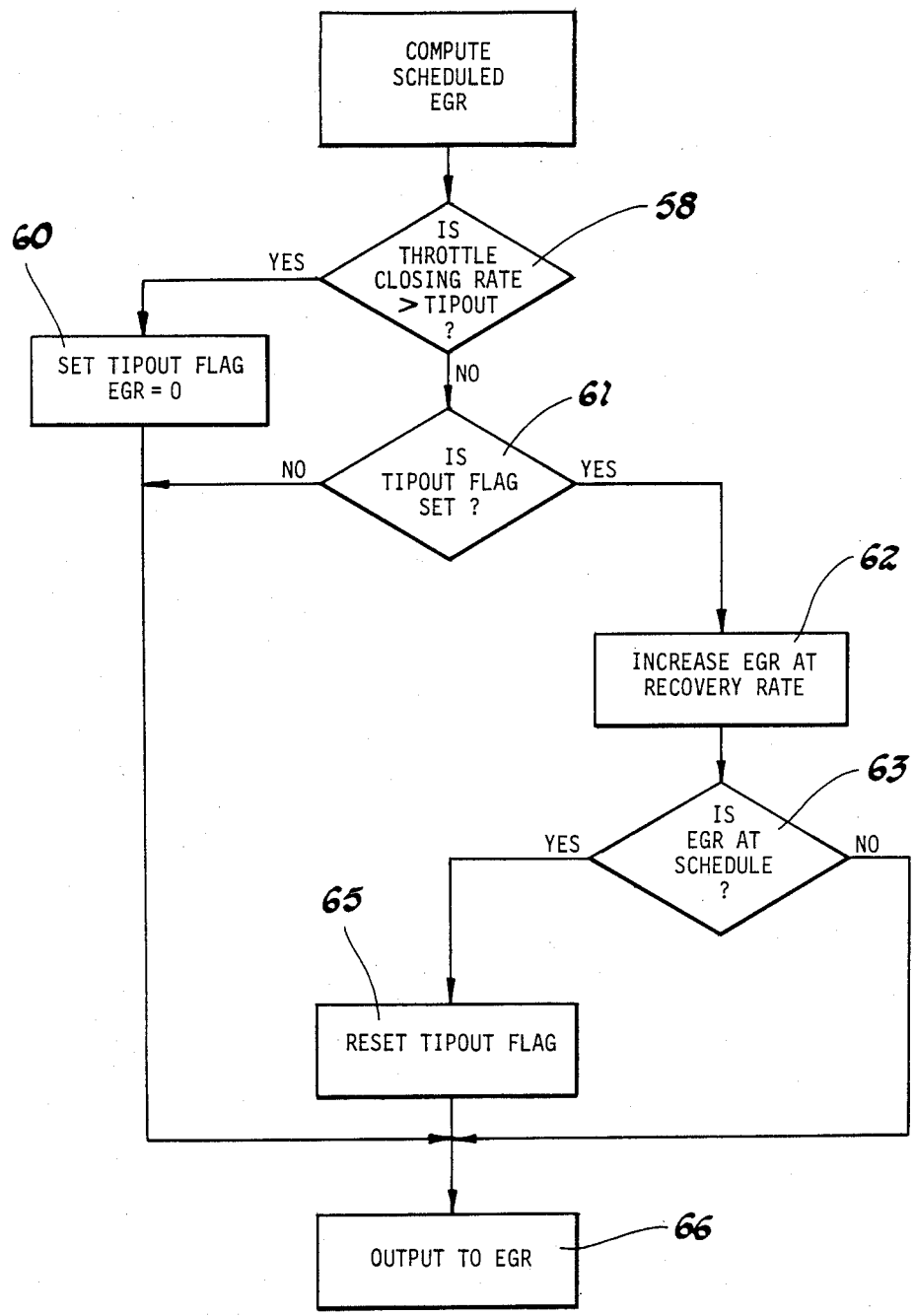
FIG. 3 shows a flow chart describing the operation of the control of this invention with the engine of FIG. 1.

FIG. 3 shows a flow chart which describes the operation of this invention in controlling EGR during throttle tipout. Throttle tipout is the closing of the throttle valve at a rate defined, in this embodiment, as greater than 3 percent. Under this condition, intake manifold vacuum increases greatly and causes more exhaust gas to be recirculated through the valve for the same opening. To avoid a sudden excess of EGR in the combustion chamber, the EGR valve is closed during the tipout and allowed to recover afterward at a controlled rate. FIG. 2(a) shows the output over time of the throttle position sensor (TPS) for a typical throttle tipout. The curve 120 shows a region 121 of sharp decrease in the TPS signal. The corresponding region 123 in the curve 122 of FIG. 2(i b), which curve 122 represents the negative rate of change of the TPS signal, shows a change exceeding negative 3 percent. The flow chart of FIG. 3 produces a desired result as shown in FIG. 2(c), in which the EGR signal goes to zero (the valve closes or is otherwise controlled to minimize EGR), as shown by the portion 126 of curve 125 during the existence of the high negative change in TPS and is then allowed to return to the normally scheduled EGR value at a controlled rate, in portion 127 of curve 125, when the condition ends.

Referring to the flow chart of FIG. 3, if the throttle closing rate exceeds a predetermined rate TIPOUT at a decision point 58, a tipout flag is set and EGR is set to zero at step 60. TIPOUT is equal, in this embodiment, to 3 percent per millisecond. This produces portion 126 of curve 125. If no throttle tipout is detected at decision point 58, the routine continues to decision point 61, in which the tipout flag is checked. If it is set, the system is in a recovery mode from a throttle tipout; and the EGR value, having previously been set to zero during the tipout itself, is increased in step 62 toward the normally scheduled value for the speed and load conditions in a predetermined step which produces a recovery, over many cycles, at a controlled rate, as shown in portion 127 of curve 125. If it is not set, then no throttle tipout or recovery therefrom is in progress; and the normally scheduled EGR value is retained.

After step 62, the new EGR recovery value is compared at decision point 63 with the regularly scheduled EGR value to see if recovery is complete. If the new EGR recovery value is equal to or greater than the scheduled value, then recovery is complete. Therefore, the tipout flag is reset at step 65 and the EGR value is adjusted, if necessary, to the regularly scheduled value.

If recovery is not found to be complete at decision point 63, however, EGR will be left at the latest recovery value. From step 60, from decision point 61 if the tipout flag is not set, from step 65 or from decision point 63 if EGR is at the scheduled value, the program proceeds to step 66, in which the EGR value is output to EGR valve 12, and then exits this portion of the control program.

The minimum value of dilution produced during a throttle tipout condition by the apparatus of this invention will vary somewhat according to the nature of the dilution control apparatus, as well as other engine operating considerations. In the case of an external EGR valve, the minimum dilution will generally correspond to a complete closure of the valve, wherein the accumulated exhaust gases already within the intake manifold will be supplemented by internal EGR associated with the combustion chamber exhaust valve or valves. In the case of a variable lift exhaust valve, its lift will be reduced to a prdetermined minimum value consistent with total desired EGR and other engine operating considerations, since the exhaust valve affects more than just EGR. The precise values for any given engine will be determined by design and calibration.

The embodiments of the invention in which an exclusive property or privilege is claimed are defined as follows:

1. An internal combustion engine comprising fuel charge supply apparatus including a throttle effective to control the mass airflow to a combustion chamber, fuel supply apparatus effective to form a combustible fuel charge therein and dilution control apparatus effective to control the admittance of exhaust gasses to the fuel charge to thereby control the dilution thereof according to a predetermined schedule, the engine being of the type which responds to a throttle tipout condition with a sudden, unscheduled increase in dilution, the engine further combprising:

first means effective to detect a throttle tipout condition comprising a rate of throttle closing exceeding a predetermined reference rate and decrease the dilution from the scheduled value to its minimum value during the existence of the throttle tipout condition; and second means to detect the end of the throttle tipout condition and return the dilution to its scheduled value at a controlled rate.

2. The engine of claim 1 in which the dilution control apparatus includes an EGR valve and the minimum value of dilution corresponds to a complete closing of the EGR valve.

3. The engine of claim 1 in which the dilution control apparatus includes a variable valve lilft mechanism for exhaust valves in the combustion chamber and the minimum dilution value corresponds to a predetermined valve lift of such exhaust valves.

* * * * *